March 22, 1960　　　C. F. WALLACE ET AL　　　2,929,393
GAS FLOW CONTROL APPARATUS

Filed March 21, 1957　　　　　　　　　　　5 Sheets-Sheet 1

FIG. 1

INVENTORS
CHARLES F. WALLACE
JOHN O. KIRWAN
BY
Robert S. Dunham
ATTORNEY

March 22, 1960

C. F. WALLACE ET AL 2,929,393

GAS FLOW CONTROL APPARATUS

Filed March 21, 1957

INVENTORS
CHARLES F. WALLACE
JOHN O. KIRWAN

BY

Robert S. Dunham

ATTORNEY

FIG. 12

INVENTORS
CHARLES F. WALLACE
JOHN O. KIRWAN
BY
Robert S. Dunham
ATTORNEY

_United States Patent Office_

2,929,393
Patented Mar. 22, 1960

2,929,393

GAS FLOW CONTROL APPARATUS

Charles F. Wallace, Westfield, and John O. Kirwan, Livingston, N.J., assignors to Wallace & Tiernan Incorporated, Belleville, N.J., a corporation of Delaware Application March 21, 1957, Serial No. 647,652

12 Claims. (Cl. 137—88)

This invention relates to apparatus for advancing gas, particularly for the control of gas flow, and is principally designed to provide new and improved apparatus for controlling and indicating the flow of gas, most preferably under low pressure and very advantageously under subatmospheric pressure, for example as in feeding a reagent gas from a source of supply at high pressure to a point of use or application. In an important specific aspect, the complete combinations of the invention are particularly adapted for feeding gas, at an adjustably controlled rate, from a high pressure source to a flow of liquid in which the gas is to be dissolved or otherwise received, e.g. to a vacuum-type injector device. A special feature resides in improved provision for automatic control of the gas feed in accordance with a plurality of independently variable condition, e.g. automatically detected conditions, as in the adjustment of the rate of gas feed in response both to changes in the need or demand of the liquid for treatment, per unit volume, and to changes in rate of liquid flow, viz. volume per unit time.

A notably significant purpose of the invention is to provide an accurately controllable system for feeding chlorine gas from a tank or other source under high pressure to an injector device in a pipe carrying a so-called minor flow of water, the injector device providing suction, i.e. at subatmospheric pressure, to draw the gas into such flow of water.

One prior form of apparatus for such purpose has involved structure providing a fixed or so-called metering orifice in the path of gas flow, together with pressure-reducing means for maintaining a substantially constant, low pressure upstream of the orifice and adjustable means downstream of the orifice to provide a vacuum or sub-atmospheric pressure, under the influence of the injector device, the adjustment of gas flow being commonly achieved by adjusting the last-mentioned means so as to vary the pressure downstream of the orifice and thus to vary the pressure drop across such orifice. While apparatus of this type is inherently satisfactory and reliable, the present invention is principally designed to afford improvements of structure, operating convenience, greater ease and range of adjustability, and still greater safety and reliability. A chief use for such apparatus is in the chlorination of water and other aqueous liquids (such as sewage) for purification, circumstances wherein it is highly necessary to maintain a desired extent of purification treatment, i.e. a desired adjustment of chlorine flow, and yet wherein operation should be essentially foolproof in all respects and should not require exceptional skill or attention by the operator.

A further object of the invention is to provide improved gas flow control apparatus, as of the character described, wherein the rate of such flow may be readily adjusted over an unusually wide range, very preferably by means of a single adjustable element or the like, continuously displaceable from one end to the other of the complete range. Another and more specific object is to afford new apparatus, preferably having this wide range of adjustability, wherein the gas flow-controlling element may be calibrated with a logarithmic or similar scale, the apparatus having not only a low percentage of possible error in its setting, but having such percentage constant throughout the entire range of the scale.

An additional object is to provide novel apparatus for controlling the feed or other flow of a gas very accurately, for example in accordance with relatively small pressure changes, such apparatus being of greatly simplified and thoroughly rugged structure, and embracing pressure and other controlling instrumentalities which do not involve flowing or continuously replenishing bodies of liquid for control, pressure-transmitting, indicating or sealing purposes.

Yet another object is to provide new apparatus, such as for water chlorination, wherein not only the tanks or other source of gas but also all conduits, valves and the like carrying such gas under high pressure may be physically isolated from the actual flow-controlling and indicating instrumentalities and from the means for applying the gas to its point of use. Heretofore, for example, preferred types of chlorinating equipment have required connection of the chlorine under high pressure directly or immediately to the instrumentalities for controlling or metering the flow. Although effort is continuously made to avoid leakage of chlorine gas, accidents or other trouble in that respect are most likely to occur in the high pressure parts of the system; indeed even the slightest failure in the high pressure lines is apt to result in some discharge of chlorine into the room where the apparatus is located. Not only is such leakage undesirable for personnel, but even in very small concentrations, chlorine is highly corrosive and apt to cause rapid deterioration of various instruments and other equipment that may be located in the control and operating room. Thus the present invention is designed to permit location of all high pressure chlorine lines in a separate room, the gas flow being thence directed at low or sub-atmospheric pressure to the operating room where actual flow-controlling instrumentalities are located, including all devices that have to be observed and adjusted by attendants in normal operation. Indeed the apparatus is preferably such that all chlorine-carrying lines and equipment in the latter locality are maintained at a vacuum or sub-atmospheric pressure; the preponderant tendency of any leak is then to admit air into the conduits rather than to discharge the corrosive gas.

A further object is to afford apparatus of novel and improved character, in which the flow of gas may be adjusted by a plurality of separate but fully cooperating means, for example so as to regulate the flow in accordance with changes of flow of the water or other liquid under treatment and in accordance with a desired dosage, e.g. in amount of the gas per unit volume of liquid treated. A particularly important object is to afford apparatus having such adjustability, attainable not only by manual means, but also automatically, for example in response to flow changes of water in a main and in response to changes in demand of the water. It will be understood that by the demand of the water or other liquid is meant the amount of chlorine needed per unit volume in order to achieve a desired measure of sterilization or other result, for example to obtain a desired residual content of chlorine after the applied chlorine has had opportunity to perform its principal function of reacting with organic or like contamination.

It may be explained that in the ordinary treatment of water, as in municipal and like supply systems, chlorine is usually required in very small quantities measured as parts per million. For example it is often desirable to maintain a residual of 0.3 to 1.0 p.p.m. of chlorine (i.e. after a certain time of contact), such result being commonly achieved by introducing the gas in amounts ranging from, say, 0.5 to 2 p.p.m. or more, i.e. depending on the actual demand of the water. On the other hand, in other situations of liquid treatment, as in the case of sewage or various industrial or recirculated systems, considerably larger amounts of chlorine may be required.

As indicated above, the present apparatus is primarily designed to feed chlorine gas to a minor flow of water, which in turn travels to the main body under treatment, the concentration thus introduced into the minor flow being many times that desired in the ultimate liquid. While certain examples of apparatus described below are designed to handle maximum chlorine flows of the order of 500 pounds per 24 hours, or to handle a very wide range of chlorine flows, the various features and combinations are nevertheless adapted to other and different flow conditions or ranges.

Additional objects are to afford novel and improved flow and pressure-controlling instrumentalities, including not only combinations of such devices for more complete purposes as outlined herein, but individual elements and subcombinations, e.g. an improved, adjustable, flow-controlling or metering orifice, improved control devices therefor, improved pressure-adjusting valve means for flow control, and improved and unusually reliable pressure-reducing valve means.

To these and other ends and advantages, such as are incidental to the use of the disclosed apparatus, certain presently preferred embodiments of the invention are described below and shown in the accompanying drawings, by way of example to illustrate the novel principles and features of improvement.

Referring to the drawings:

Fig. 1 is an essentially complete view, somewhat schematic in nature but showing many structures in simplified, vertical section, of one form of the improved apparatus for feeding reagent gas from a source under pressure to a water main or the like;

Figure 1:
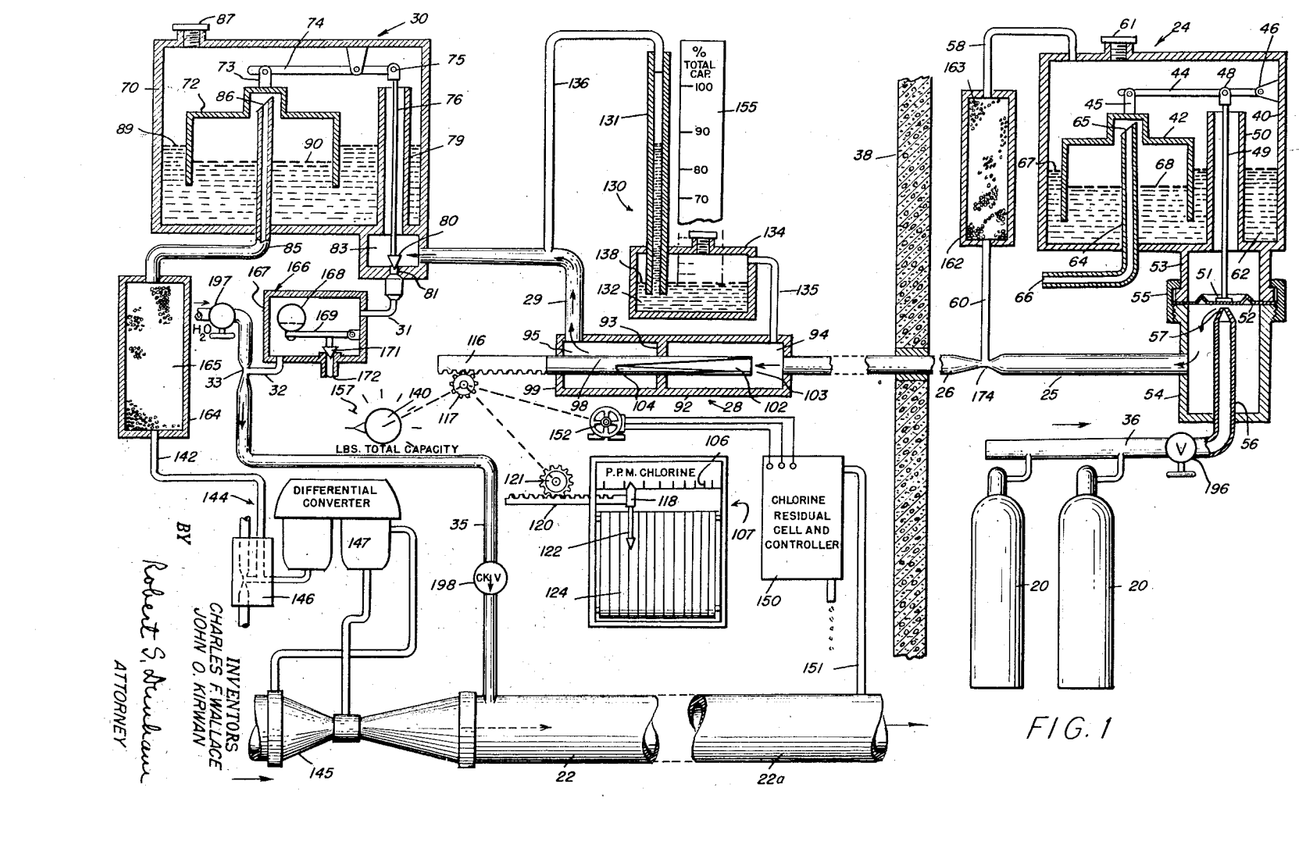

Referring first to Fig. 1, the apparatus is shown in a system for supplying chlorine gas from a source under high pressure, e.g. one or more tanks 20, to water flowing in a main 22, specifically to provide a continuous, regulated, rate of chlorine introduction. Described generally, the system comprises a pressure-reducing valve 24 from which chlorine at greatly reduced pressure flows through a line 25, 26 to and through an adjustable orifice device 28 and thence via a further conduit 29 to a flow control valve 30. From the latter device the gas is drawn, via a conduit system 31, 32, into a suction-type injector 33 which is disposed in a pipe 35 that carries a continuous, minor flow of water to the main 22. The gas being delivered from the cylinders 20 at a high pressure, e.g. of the order of 80 pounds per square inch, the valve device 24 reduces its pressure to a low value, preferably a predetermined slight vacuum, the injector 33 providing a considerably higher vacuum, which is brought to an adjustable, regulated value on the downstream side of the orifice device 28, by the control valve 30. The rate of chlorine flow is thus specifically governed by the size of orifice in the device 28 and by the difference of pressure across such orifice, both of these values being independently yet cooperatively adjustable as explained below.

As indicated above, the arrangement is very advantageously such that the reducing valve 24, as well as its supply line 36 from the chlorine cylinders 20, and indeed the latter cylinders themselves, are disposed in a separate room or other locality, from the balance of the illustrated apparatus, specifically the orifice device 28, the control valve 30, the injector 33 and related instrumentalities as defined below. The separation of the two sections of the system is indicated by the wall 38, through which the conduit 26 passes, carrying chlorine at low, e.g. sub-atmospheric, pressure.

The improved reducing valve 24 comprises a closed chamber 40, conveniently of upright cylindrical shape, in which there is disposed an inverted vessel or bell 42 suspended at the end of an essentially horizontal lever 44, e.g. by a supporting member 45 which projects upwardly and centrally from the bell and is pivoted at the outer end of the lever 44. The opposite end of the lever is pivoted at a fulcrum support 46 carried by an inner surface of the chamber 40, so that the bell 42 is free to move in a vertical direction, with the lever correspondingly swinging in a vertical plane about its horizontal pivot axis 46. Pivoted to the lever 44 at a suitable locality 48, e.g. such as to provide a large mechanical advantage for the bell, a rod or valve stem 49 extends downwardly through a sleeve-like guard or conduit 50 and carries at its lower end a valve-operating disk or button 51.

The valve member 51 is adapted to abut the upper face of a flexible diaphragm 52, which is conveniently of circular configuration and is peripherally clamped between upper and lower portions 53, 54 of a vertically cylindrical valve chamber assembly, the two cylindrical parts 53, 54 being thus forced toward each other by a suitable clamping ring or the like 55. The space in the upper part 53 of the valve chamber, and thus the upper face of the diaphragm 52, communicates freely through the sleeve 50 with the space in the upper part of the chamber 40, while the lower valve chamber 54 opens into the conduit 25 through which gas discharges toward the orifice device 28. Connected to the high pressure gas supply conduit 36, a further conduit portion 56 traverses the wall of the lower valve chamber 54, terminating in a nozzle-like opening 57, e.g. a circular opening of conveniently reduced diameter (relative to the conduit 56) which is disposed just below the center of the diaphragm 52 in registering relation to the operating disk 51 and which thus constitutes a valve seat to be abutted and closed by the diaphragm 52 when the latter is moved downwardly by the operating member 51.

The upper part of the chamber 40 communicates with the conduit 25 at the downstream side of the valve, as by a conduit or tube system 58, 60, so that the pressure in the upper part of the chamber 40 and thus on the upper surface of the diaphragm 52, is governed directly by the pressure on the outlet side of the valve. Through a removable plug 61, the chamber 40 is at the outset partly filled with liquid, e.g. water 62. A pipe 64 extends into the chamber 40 beneath the bell 42, opening upwardly at a high locality 65 therein, and opening at its other end 66 to a substantially constant source of gas pressure, specifically and most conveniently the atmosphere at normal atmospheric pressure. As explained further below, the arrangement is such that a small vacuum is maintained in the upper part of the chamber 40, causing the water level 67 outside the bell to assume a height elevated from the level 68 under the bell by a predetermined small amount, a convenient value being ½ inch, thus representative of ½ inch of vacuum (the pressure below atmospheric equal to ½ inch of water head) in the upper part of the chamber.

For convenience in supplying water initially to the chamber 40, it may be introduced to a predetermined level somewhere in the neighborhood of the desired operating point for the level 67. Since the chief force derived from the bell and lever system is dependent upon the weight of the bell and upon the difference of pressures manifested by the difference of levels 67, 68 and since minor changes in the displacement of the submerged skirt portion of the bell 42 itself are of little consequence, the precise amount of water introduced into the chamber 40 is not critical; however, best operation will be obtained by keeping the level 67 at a substantially constant point for which the other parts are designed or adjusted to function most effectively, the total volume of water being preferably less than would raise the level 68 to the height of the opening 65 should the pressure outside the bell in the chamber rise to a value where the level 67 reaches the lower edge of the bell skirt.

Assuming for simplicity that the conduit 58, 60 connects directly with the low pressure chlorine tube 25 so that the upper interior of the chamber has the same pressure as the tube 25, the operation of the valve device 24 will now be readily explained. Essentially the device then operates to throttle the valve opening 57, by the closed position of the diaphragm 52 under the pressure of the valve disk 51, so as to maintain the pressure in the line 25 at a value of ½ inch below atmospheric, regardless of the amount of chlorine flow through the conduit assembly constituted by the tube 56, chamber 54 and conduit 25. For example, if an increase of flow (under control of instrumentalities 28 and 30 as described below) occurs, it is manifested by a tendency of the pressure in line 25 to fall. Such drop is communicated to the upper part of the chamber 40, causing a decrease of pressure outside the bell, and thus creating a tendency for the bell 42 to rise and for the valve stem 49, linked therewith, to elevate the member 51. As the diaphragm 52 is thus allowed to rise further from the seat 57, the increased flow of gas raises the pressure in the line 25, and likewise in the upper part of the chamber 40, so that balance is ultimately restored with the gas in the line 25 at the desired pressure of ½ inch vacuum. Upon departure of the flow or pressure in the line 25 in the other direction, a reverse, similarly corrective sequence of operations occurs, e.g. to keep the pressure constant at a lower flow rate, the valve 57 being then more nearly closed. In either case, the response of the valve device 24 is essentially instantaneous, i.e. promptly following any changes in pressure or flow induced in the conduit 25, the result being that the pressure in the latter conduit is maintained at the desired constant level.

The value of the difference in pressure between the interior and exterior of the bell 42, e.g. ½ inch of water in the example given above, is determined essentially by the weight of the bell, i.e. relative to its horizontal area. Strictly considered, the effective weight of the bell is influenced to some extent by forces transmitted to it through the system of the lever 44. For example, some force may at times be needed to oppose the effect of a high pressure of the gas in the line 56 on the valve element 51; the lever 44, however, may have a high ratio, e.g. about 25 to 1 for the arms 45 and 49 about the fulcrum 46, so that forces required on the arm 49 have only a slight influence on the effective weight of the bell. Thus the amount of vacuum to be maintained in the line 25 may be readily determined, as will now be appreciated, by appropriate design or adjustment of the bell 42, i.e. with respect to its weight, so that the forces on the bell will be in balance when the pressure difference across it is equal to ½ inch of water. It will be understood that the upward force on a thin-walled bell having a constant cross-sectional area and circumstanced as in the devices of Fig. 1 is determined by the arithmetical product of such area and the difference in pressure between inside and outside.

The device 24 thus functions effectively to maintain the gas in the line 25 at a vacuum of ½ inch, e.g. by the necessary minute regulation of the spacing of the diaphragm from the valve seat 57, over a wide range of gas flows, such as mentioned hereinbelow.

It will be noted that the valve device 24 is entirely automatic, preferably requiring no springs or similar parts, and requiring practically no attention, even with respect to the quantity of water 62. Experience has indicated that in service for chlorination, very little water evaporates even over long periods of time, and that replacement is only required after a substantial lowering of the two water levels 67, 68. The valve arrangement afforded by the diaphragm 52 is extremely simple and effective, preventing access of flowing chlorine to the upper parts of the assembly, and serving both as valve closing element and gasket for the valve chamber. The diaphragm is preferably made of a resilient plastic suitably resistant to attack by chlorine gas; rubber, neoprene and other materials are useful, and an outstanding example is the plastic polytetrafluoroethylene. Very conveniently, all of the structural parts including the chamber 40, bell 42, linkage 44, 49 and the valve chamber structure 53, 54 may be constructed of transparent plastic composition, e.g. Lucite or other methacrylate resin. In other circumstances, other materials may be employed, and indeed the diaphragm 52 may be resiliently constructed of a metal (such as silver or tantalum, for chlorine gas) with a suitable resilient cushion to face the seat 57. As will also be appreciated, the reducing valve structure is adapted for other uses than in chlorinating equipment, viz. to provide pressure reduction to a maintained value, governed by atmospheric or other source of constant or controlled pressure connected to the tube 64.

One control of the complete system of Fig. 1 being effective with respect to the drop across the orifice device 28, the valve means 30 is thus provided to achieve and maintain an adjusted value of pressure on the downstream side of the orifice device. Since the valve 24 keeps the pressure constant on the upstream side, the gas flow through the system, for any adjusted value of the downstream pressure, will depend solely on the size of the orifice in the device 28.

Essentially the device 30 is provided to achieve an automatically regulated pressure in the chlorine-conducting line downstream of the orifice in the device 28, the flow of chlorine being effectuated by the vacuum induced at the injector 33 and communicated through the lines 32, 31. This applied vacuum, for instance equal to 15 inches of water head or more (i.e. 15 or more inches below atmospheric) may tend to vary considerably, but the device 30 functions to maintain a constant degree of vacuum in the line 29, regardless of rather wide changes at the injector 33. Specifically, while other pressure-controlling valves may be employed, the improved device 30 comprises a chamber 70 in which is disposed an inverted vessel or bell 72, suspended by a member 73 pivoted at one end of a lever 74, the other end of the lever 74 being pivoted at 75 to a valve stem 76, the lever being pivotally supported, to swing about a horizontal axis at a fulcrum 77 between its ends 73, 75 and so positioned as to afford substantial mechanical advantage for the bell 72 over the valve rod 76.

The valve rod 76 extends down through a sleeve-like guard 79 and terminates in a valve member 80 adapted to move toward and away from a valve seat 81, i.e. in accordance with vertical displacement of the rod 76. As will now be appreciated, the structure of many parts of the device 30 is somewhat similar to corresponding parts in the reducing valve 24, except that here the valve 80 is adapted to seat against a lower pressure and the member 74 is therefore conveniently constituted as a lever of the first class, in contrast to the second class lever 44 of the device 24. Although if desired a balanced type of valve may be used between the conduits 29 and 31 to minimize effects of large pressure difference on the valve elements, effective results have been achieved with a simple valve arrangement such as exemplified by the elements 80, 81.

As shown, the valve seat 81 constitutes an opening to the conduit system 31, 32 which extends to the injector 33, the valve thus communicating, when open, into a valve chamber 83, which in turn opens to the conduit 29 from the orifice device 28. A conduit or tube 85 extends upwardly into the bell 72 from a locality outside the chamber 70, in similar fashion to the tube 64 in the device 24, the upper end 86 of the tube thus opening beneath the bell 72. The chamber 70 is partly filled with liquid, e.g. water, through an opening normally closed by the filler plug 87. For convenience, the water may be introduced to a predetermined level although as in the case of the device 24, the absolute amount of water is not critical, providing preferably that there is no more than will fill the bell 72 to a level somewhat below the opening 86 should abnormal pressure conditions occur such as would force the water outside the bell down to the lower edge of the bell skirt.

The tube 85 being connected to an adjustable vacuum source (for example as described below), the device 30 functions automatically, i.e. by regulating the position of the valve element 80, so as to maintain in the chamber 83 and the conduit 29 a vacuum directly corresponding to that transmitted through the tube 85. For example, in the device shown the assembly is designed to provide a pressure in the upper part of the chamber 70, and thus in the valve chamber 83, which is constantly lower, by ½ inch of water head, than the pressure under the bell 72; thus the sub-atmospheric pressure maintained in the chamber 83 is always ½ inch less (i.e. is a vacuum ½ inch greater) than is maintained under the bell 72. As in the case of the reducing valve device 24, this constant difference is essentially produced and determined by the weight of the bell 72 itself.

The function of the control valve device 30 in its automatic adjustment of the valve element 80 to follow changes in vacuum communicated under the bell 72 is now readily explained. Assuming that the parts are in balance and that the valve 80 is positioned so as to provide a drop across the valve opening 81 which yields a given vacuum, say 6 inches of water, in the chamber 83 (corresponding to a vacuum of 5½ inches under the bell 72) it may be supposed that the vacuum under the bell is increased, i.e. the pressure there is reduced, to a value of 8 inches below atmospheric. The immediate result of such reduction is to provide a force downwardly on the bell, tending to rock the lever 74 counterclockwise as seen in Fig. 1. By virtue of the arrangement of the lever, the tendency of the bell to move downwardly, effects wider opening of the valve element 80 and reduces the drop across the valve aperture 81, i.e. permits, in effect, a higher vacuum to be communicated from the injector 33. In consequence the parts promptly, and with only the slight actual displacement needed to re-position the valve element 80, reach a new location of balance, where the pressure in the upper part of the chamber 70 and thus in the valve chamber 83 and line 29 is at a value ½ inch lower than that now existing under the bell. That is to say, balance is promptly reeffected at a correspondingly new vacuum of 8½ inches. Should adjustment of the vacuum under the bell 72 be effected in the opposite direction a reverse operation occurs, readjusting the valve element 80 to provide a lower vacuum, i.e. higher pressure, in the chamber 83.

So long as the desired controlling pressure under the bell 72 remains constant at a given value, the pressure in the conduit 29, downstream of the orifice device 28, is maintained at a corresponding value, regardless of flow changes effected by other control and regardless of changes in the sub-atmospheric pressure induced by the injector 33. That is to say, any tendency to change of pressure in the valve chamber 83 occasioned in one or another of the ways last mentioned, results in a prompt follow-up displacement of the valve element 80 so as to re-establish the selected pressure in the upper part of the chamber 70, i.e. thus always maintaining the pressure in the valve chamber 83 at the desired value governed by the pressure under the bell 72. It will be understood that in operation the valve device 30 maintains the water level 89 outside the bell at a constant elevation, e.g. ½ inch, above the water level 90 under the bell 72, the net effective weight of the bell (as in the case of the reducing valve device 24) providing downward force equal to the upward force exerted on the bell by a pressure difference of ½ inch between its interior and exterior.

Indeed it may be here noted that the reducing valve 24 is similarly responsive, in its maintenance of a constant pressure in the line 25, not only to changes of flow there but also to changes of the high gas pressure in the supply conduit 56, i.e. effecting appropriate re-balancing adjustment in prompt response to any appreciable high pressure variation. It will thus be seen that the reducing valve device 24 essentially serves to maintain a constant pressure on the upstream side of the orifice device 28, while the control valve 30 maintains an adjusted pressure on the downstream side of the orifice device, the last-mentioned pressure being constant at any value which may be selected by change of the pressure communicated through the conduit 85. For any given size of flow reducing orifice intermediate the conduit portions 26 and 29, the gas flow will thus be determined by the difference of pressures at these localities, such difference being controlled solely by the adjustment of pressure communicated through the tube 85.

While for some purposes important advantages of the invention may be achieved with other adjustable orifice arrangements intermediate the localities 29 and 26 of the chlorine-feeding conduit structure, especially effective results are achieved with the type of device shown at 28 in Fig. 1. Specifically, the device 28 comprises an elongated chamber 92, which may be of long, cylindrical shape, divided transversely at a central point by a wall 93 so as to provide two chamber portions 94, 95 respectively communicating with the conduit portions 26, 29. The wall 93 has a conveniently central opening 96 (see Figs. 2 and 3), for example of circular shape, traversed in sliding but relatively close fit by a long rod 98, which extends out through one end 99 of the chamber 92, e.g. through an appropriate packing device as indicated at 100 in Fig. 2. The rod 98 has a longitudinal, tapering notch 102, for example conveniently tapering from a large cross-sectional area at the end 103 of the rod to an apex 104 at a more central part of the rod. Thus upon sliding the rod back and forth, the effective aperture constituted by the portion of the notch which rests within the wall opening 96, is correspondingly varied, e.g. from a large aperture when the rod is withdrawn to the left (as seen in Figs. 1 and 2) with the end 103 adjacent the wall 93, to a very small aperture as the rod is moved to the right and the notch apex 104 approaches the central wall.

Figures 4, 5, 6:
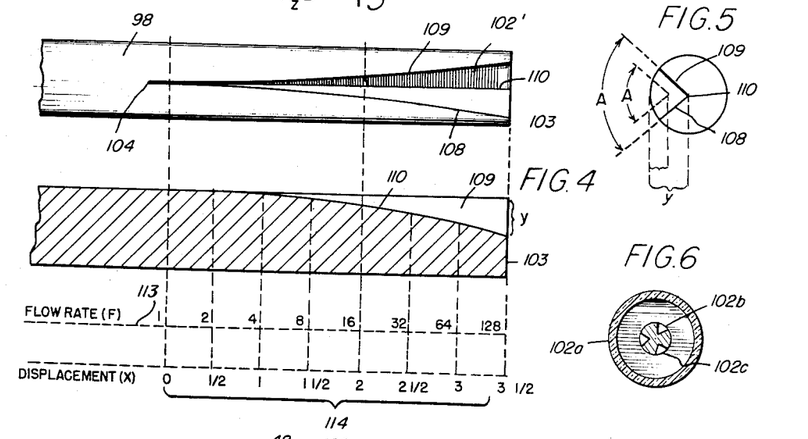
Fig. 4 is a diagrammatic view to illustrate the configuration of an orifice-adjusting member of Fig. 2, the member in Fig. 4 being indicated both in elevation and longitudinal section.
Fig. 5 is a similarly diagrammatic, endwise view of the member.
Fig. 6 is a section similar to Fig. 3, but showing an orifice-adjusting member of modified configuration.

The shape and length of the notch 102 may vary with circumstances and requirements of use, the cross-sectional boundary of the notch being curved, rectangular, V-shaped (as shown) or of other configuration, the illustrated V-notch being not only effective but particularly simple to make as by appropriate machining of the rod 98. Indeed in some cases if desired there may even be a plurality of notched rods displaced in parallel through a correspondingly apertured wall, or as shown in Fig. 6, the rod may have a plurality of notches 102a, 102b and 102c collectively functioning in similar fashion; but for convenience of description, reference will be made to a single-notched rod, which has been found very satisfactory.

Figure 2:
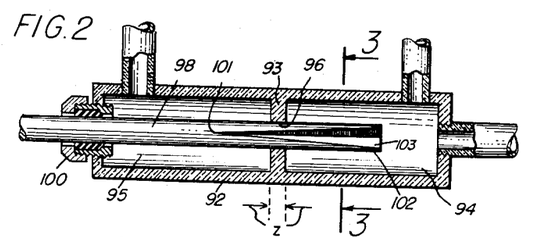
Fig. 2 is an enlarged vertical section of an adjustable orifice shown in Fig. 1.
Figure 3:
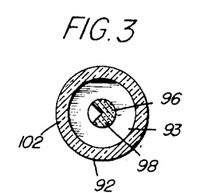
Fig. 3 is a section on line 3—3 of Fig. 2.

The variable orifice device, e.g. as shown in Figs. 1, 2 and 3, not only affords a remarkable facility of adjustment (in providing substantial longitudinal displacement for minute changes of orifice size) but affords special advantage in the shaping of the notch 102 for agreement with a desired calibration or scale for the adjustment. That is to say, for any given, separately maintained pressure drop across the orifice, the amount of gas flow will vary with change in the size of the orifice, and by appropriately shaping the notched configuration of the rod 98, the relation between flow change and rod position may be made to follow any of various desired curves or equations.

A new and particularly convenient arrangement in this respect has been found to result from a notch which bears an elongated, exponential taper, the notch also advantageously being such that all of its cross-sections are geometrically similar or otherwise so shaped that the ratio of cross-sectional area of the notch to the square of the perimeter (i.e. total perimeter of the orifice resulting in the wall opening 96) is substantially constant throughout the useful length of the notch. Specifically, the arrangement is such that as the rod is displaced endwise, from minimum to maximum orifice opening, the flow rate varies in an exponential manner with the displacement. That is to say, the logarithm of the ratio of the flows at any two rod positions is proportional to the displacement between said positions. An equation for describing such relationship is:

$$\text{Log}\frac{F_2}{F_1}=nx$$

where $F_2$ is the larger flow, $F_1$ is the smaller flow, $x$ is the distance between the rod positions corresponding to $F_2$ and $F_1$, and $n$ is a constant which is selected to give a convenient rate of taper to the notch. A scale indicating the flow may then be ruled in logarithmic fashion, e.g. as indicated at 106, in a suitable indicating and recording device 107, more fully described below.

One convenient way of achieving the last-described result, with a V-shaped notch, is illustrated in diagrammatic views, Figs. 4 and 5, where it will be seen that the equal side faces 108, 109 and likewise the bottom apex 110 taper along curved paths from the end 103 to a point 104 where they closely approach as a limit the outer cylindrical surface of the rod. A suitable point of zero displacement is taken at a very small orifice opening near the left-hand end of the notch, i.e. as indicated on the displacement scale 112 at the bottom of Fig. 4. Assuming that the flow at zero position represents a value of 1 unit (e.g. in volume per unit of time) and assuming further that the flow should double for each one-half inch displacement of the rod, it will be seen that as the displacement increases in a linear manner, the preceding equation can be rewritten in the form $F=4^x$, where F equals the flow rate at any point $x$ inches from the zero displacement position (i.e. from the position at which the flow is unity).

Specifically, for instance, where the rod 98 had a diameter of ¾ inch and the usable displacement range 114 (avoiding regions immediately adjacent the end 103) was selected as 3⅓ inches, the values on the scale 112 are indicated in inches of displacement from the unit or minimum flow position. Thus in the range selected for use, the flow rate may vary up to 100 times the minimum value, affording an extremely wide range of flow adjustment. In the example cited the dimension $y$, Fig. 5, was approximately 0.028 inch at the position of minimum flow, and the thickness of wall 93 (dimension $z$, Fig. 2) was approximately 1/32 inch. Under such circumstances, it is found that the flow at various rod positions is closely proportional to the notch area at those positions.

The calibration or scale of the adjustment by displacement of the orifice is of a logarithmic character, i.e. such that the percentage of error is constant throughout the length of the scale. That is to say, to the extent that a small tolerance may be allowed or required in setting the device or in the response to its setting, the error of the flow setting will be the same, i.e. in percent of the flow rate, at low as well as high scale positions. This feature is of particular advantage for gas supply apparatus, especially chlorinating apparatus, where accuracy of setting or response is thus most readily determined for any scale position, with correspondingly high absolute accuracy, i.e. in absolute flow units, even at the lower end of the scale where minute changes are most important.

In making the notch 92 to correspond with the relationship illustrated in Fig. 4, the angle A between the faces 108, 109 of the notch may advantageously be constant throughout the latter, one example of a convenient value being 60°, and the dimensions of the notch (e.g. in terms of its altitude $y$) at various localities along the rod may be readily calculated from the desired formula (as above) for variation of flow rate with displacement of the rod. Alternatively, with high accuracy, the precise cross-sectional area of the notch or groove at each of a multiplicity of localities along the rod can be determined empirically by measuring the flow of gas through a trial notch and adjusting the notch area until the desired flow is obtained. While other configurations and arrangement of the notched rod structure may be employed to good effect in certain cases, such as shapes whereby the flow is linearly proportional to rod position or whereby the square of the flow is proportional to rod position, the described shape is of unusual advantage, as indicated above and for convenient adaptability to the needs of chlorine supply equipment.

Longitudinal adjustment of the rod 98 is effected by suitable means, one example being a rack 116 extending from the outer end of the rod, in mesh with a pinion 117 which is turned to adjust the rod. For indicating the state of adjustment, the device 107 may conveniently embody a pointer 118 carried by suitable adjusting means coupled to the pinion 117, so that the pointer moves over the scale 106 in correspondence with the position of the rod 98. For instance the pointer 118 may be carried by a rack 120 in mesh with a pinion 121 which is mechanically coupled to the pinion 117 for drive therewith. The rack 120 may also carry pen arm 122 adapted to provide a record on a continuously advancing strip chart 124, i.e. to record the position of the orifice at all times.

The orifice device 28 and likewise the control valve 30 may be constructed of any suitable material, e.g. appropriate to the conditions of service and the nature of the gas which is being advanced along the conduit system. While opaque materials, such as hard rubber, corrosion-resistant metals and the like can be used (as likewise in the case of the valve 24), transparent material, such as glass or most preferably transparent plastic of the sort mentioned above for the parts of the reducing valve 24, is especially desirable. Thus by making the chamber 70, bell 72 and associated structural parts of the control valve 30 of such transparent material, and likewise the chamber 92 of the orifice device, constant visual observation of the internal condition and position of various parts, water levels and the like is afforded, including recognition of the presence of chlorine gas in the flow conduit, by its characteristic yellowish color. The rod 98 is likewise made of any suitable substance, preference being for relatively hard or durable material, such as glass, or especially a coherent carbon or carbon-graphite composition, as indicated in Fig. 2. Wall 93 is preferably made of a tough resilient plastic, resistant to attack by chlorine gas and conveniently available in thin sections, such as polytetrafluoroethylene.

It will be understood, without further reference, that all parts of the equipment which are exposed to corrosive gas are constructed of suitably resistant substances; at the same time, an important feature of the apparatus is that the number of working and other parts exposed to such gas is extremely small, and there is essentially no opportunity for escape of gas, as occurs by carriage in solution through flowing water seals and the like in some types of prior apparatus.

For indication of the actual pressure drop across the orifice device 28, suitable means such as the manometer 130 may be provided, for example a manometer of the liquid-column type, embodying the vertical transparent tube 131 projecting into a body of liquid, e.g. water, 132 contained in a closed chamber 134, the chamber communicating via the tube 135 with the upstream portion 94 of the orifice chamber, and the upper end of the manometer tube 131 communicating via tube 136 with the downstream portion 95 or (as conveniently shown) the conduit 29. Thus the actual pressure drop across the orifice will be registered, e.g. in inches of water, by the elevation of water in the tube 131 above the level 138 of the relatively large body of water in the vessel 134.

The apparatus of Fig. 1 is thus controlled by adjustment of two factors, i.e. the pressure under the bell 72 in the control valve 30 and the longitudinal position of the orifice rod 98. In each case, if desired, the adjustment may be simply manual, for example as by a suitable, manually-controlled vacuum source (not shown) connected to the tube 85 and by suitable manual means for turning the pinion 117, e.g. as indicated by the coupled knob 140, but the apparatus is especially adapted for automatic regulation in accordance with conditions in the water main or other body of material to which the reagent gas is being supplied.

Indeed a special feature of the invention resides in a novel combination of means for automatically controlling the feed of a fluid treating agent such as chlorine gas in response to a plurality of variable factors, especially the factor of rate of flow of the aqueous liquid or other material under treatment and the factor of demand or need of such material for treatment—the demand factor being determinable, in effect, by automatic test either of the raw (untreated) material or of the results of treatment. To this end Fig. 1, for example, includes means for controlling the pressure under the bell 72 in accordance with changes of flow of water, as in the main 22, and for controlling the position of the rod 98 pursuant to the actual requirement of the water for treatment.

Thus the conduit 85 extends, through a suitable continuation 142 to means generally indicated at 144, for transmitting a vacuum which varies in accordance with changes of flow in the main 22. One example of such device is a so-called differential converter, which is governed by changes of pressure drop at spaced localities in a venturi 145 in the main 22, such device including aspirator means 146 for separately establishing a vacuum, controlled by instrumentalities indicated at 147 so as to vary appropriately with changes in rate of flow. One form of differential converter of this sort is described in Patent No. 1,762,706, granted June 10, 1930, for Apparatus for Producing a Proportionately Varying Negative Pressure, although it will be appreciated that other devices may be employed for accomplishing a similar result.

To control the position of the orifice rod 98, one convenient means constitutes an electrochemical cell responsive to minute chlorine concentrations and associated with suitable electrical control devices governed by the cell, such means being well known in various forms and thus here generally represented, without detail, at 150 in Fig. 1. Specifically, the chlorine-sensitive cell and controller 150 may be connected to withdraw a sample flow of the treated water through a pipe 151 from a portion 22a of the main which is suitably remote from the locality of chlorination at the discharge end of the pipe 35. Thus the cell device is sensitive to so-called residual chlorine and is connected to control a reversible motor 152 or like driving element to provide adjustments upon departure of the chlorine residual from a desired, safe value, i.e. the residual chlorine concentration which remains after the immediate need of the water for consumption of chlorine has been satisfied. In Fig. 1 the motor 152 is appropriately coupled to the pinion 117, the controller 150 then operating, as will now be understood by persons familiar with the art, to adjust the pinion for appropriate increase or decrease of chlorine feed when the residual departs below or above a desired value (say of the order of 1 p.p.m. or even a fraction thereof), the arrangement being thus such as to vary the chlorine flow as necessary to maintain a constant predetermined value of chlorine residual in the liquid being treated in the main 22.

Under the completely automatic control of the differential converter 147 and the residual cell device 150, the feed of gas is directly regulated in accordance with both changes of flow and with any other changes which will affect the response of the liquid to treatment, i.e. as evidenced by the residual chlorine determination, which in effect takes account of the demand of the liquid for treatment. Specifically, the total drop across the orifice in the wall 93 is adjusted by the valve device 30 in accordance with changes of water flow, while the position of the orifice rod, and thus the size of the orifice, is changed to correct changes in chlorine residual and thus in effect to met variations in demand; greater feed of gas being obtained by increasing the orifice drop or by increasing the orifice dimensions, and vice versa. It will be understood that reverse or other arrangements of the control devices may be employed, in some cases.

Thus for example, the scale 155 for the manometer 130 (which shows inches of pressure drop) may be calibrated directly in percentage of total capacity of the apparatus. Over a predetermined range of pressure drops, say from zero to 12 inches, the apparatus may be deemed to be operating at full or 100% capacity at the upper end of the range and a corresponding percent of such capacity, measured as flow, at lower values of the metering orifice drop. At the same time, the position of the orifice-adjusting rod 98 may be indicated in a cooperating manner, for example as shown at the scale or dial 157 of knob 140, in effective or total capacity available for each setting of the orifice. Specifically the scale 157 may show the pounds of chlorine per 24 hours which represent the total flow capacity of the chlorinator at various settings of the orifice. Alternatively, and even more conveniently, the orifice adjustment may be calibrated directly in amount of chlorine applied per unit quantity of liquid, i.e. when the drop across the orifice is regulated in accordance with the flow in the main. Thus the scale 106, and likewise the strip chart 124 (see also Fig. 9) can be conveniently marked as amounts of chlorine applied in parts per million.

Figure 9:
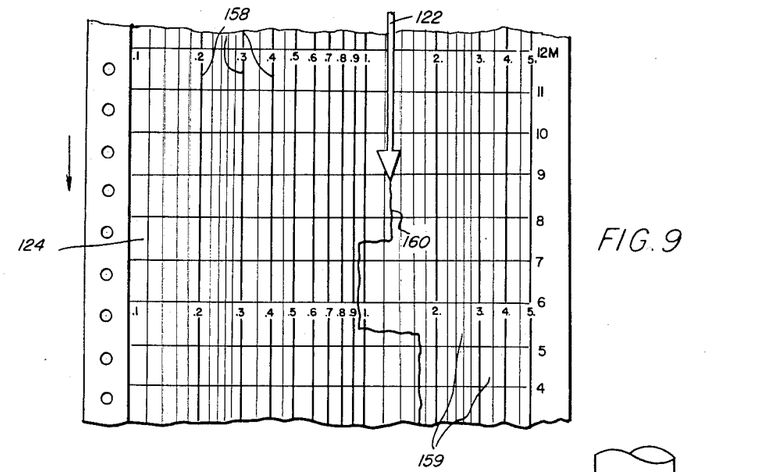
Fig. 9 is a fragmentary view of part of a recording device shown in Fig. 1, particularly illustrating a form of chart used in such device.

As explained above, the scale 106 and the chart 124 (and indeed likewise the scale 157) are advantageously of logarithmic type, with desirably large spread at the low values of chlorine flow or dosage. Fig. 9 illustrates the nature of a suitable chart 124, having vertical lines 158 representing values of chlorine in p.p.m. (for use when a differential converter or the like is employed as shown at 144), together with horizontal lines 159 to indicate time. Thus the track 160 marked by the pen arm 122 will show the actual quantity of chlorine applied, in p.p.m. continuously during the operation of the apparatus. The manometer 130 affords a convenient check of the function of the system, e.g. in response to changes of water flow in the main which may be independently known to the operator. Indeed under either automatic or manual control of any sort, the actual rate of chlorine flow may at any time be conveniently determined by multiplying the reading of the dial 157 (e.g. the then capacity of the system) by the reading of the scale 155, which gives the percentage of such capacity which is actually being used.

A range of pressure drop from zero to 12 inches (of water) across the variable orifice has been mentioned above, by way of illustrative example. It will be understood that in such case, where the pressure upstream of the orifice is kept constant at one-half inch below atmospheric, the control instrumentalities are designed and operated to provide a pressure immediately downstream of the orifice, which is adjusted between one-half inch (for zero flow) and 12½ inches (for full capacity flow) below atmospheric.

Certain supplemental devices have been found advantageous in various parts of the apparatus, particularly in a system for chlorination such as shown in Fig. 1. For example, a wet chlorine absorber chamber 162 is connected intermediate the conduit portions 58 and 60 of the line by which the upper part of the reducing valve chamber 40 communicates with the low pressure chlorine delivery line 25—26. This chamber 162 which may be filled with suitable material 163 in granular or like form that is adapted to absorb moist chlorine, e.g. metallic zinc, serves essentially to prevent travel of moist chlorine gas in the line 60, for corresponding benefit in operation, including the avoidance of corrosion in further parts of the chlorine delivery system (e.g. when made of metal corrodible by wet chlorine), and possible condensation, as at the adjustable orifice in the device 28. Although other substances, such as silica gel, can be used in the absorber, zinc has a great affinity for wet chlorine (by reaction) and a filling of it lasts a long time. While the chamber 40 of the valve assembly 24 has been found to breathe through the line 58—60 only at rather infrequent intervals (with consequent long life for the absorber material 163) the device 162 provides an additional feature contributing to the reliability of the apparatus. It will be understood, in passing, that the conduit 64, which effectively opens the interior of the bell 42 to the air, may be of suitable length (not shown) such that its opening 66 is outside the building or otherwise disposed so that any slight quantity of chlorine gas, released from solution in the water 62, is harmlessly dissipated.

A suitable chlorine absorbing chamber 164 may also be included in the conduit system 142—85 whereby a controlled vacuum is communicated to the interior of the bell 72, e.g. from the differential converter 147 or like device. The chamber 164, filled with granular or similarly divided chlorine-absorbing material 165, such as metallic zinc, prevents seepage of chlorine gas, as released from solution in the water in the chamber 70, the life and reliability of the differential converter being promoted by avoiding exposure of its working parts to chlorine.

A further safety device may comprise a suitable trap 166 between the injector 33 and the pressure-adjusting valve 30. Although other trap devices may be employed, a convenient structure comprises a closed chamber 167, opening at a lower part to the conduit 32 which extends to the injector throat, and opening at an upper part into the line 31, through which the flow of chlorine gas is delivered from the valve opening 81. Within the chamber 167 a float 168 is carried on the end of a lever 169 which is pivoted to a stationary fulcrum 170 at its other end and which also operatively carries a valve closure member 171, normally closing a corresponding seat opening at a drain conduit 172. The float 168 is suitably weighted or otherwise appropriately designed so that during ordinary operation, i.e. when there is no liquid in the chamber 167, the weight of the lever assembly keeps the valve member 171 closed, and chlorine is delivered directly along the conduit assembly 31—32. If upon the occurrence of any accident or other abnormal condition, water from the injector line 35 should back up into the chamber 167, it will elevate the float and open the valve 171, so as to permit rapid discharge of the water. Thus there is no possibility of the water rising to such level that it would flow on through the conduit 31 and into other elements of the apparatus or of the chlorine supply system.

In some cases the conduit 26, extending from the chlorine supply elements to the adjustable orifice 28 may be rather long; indeed the chlorine room, indicated at the right of the wall 38, can be remote from the chlorinator or instrument room, indicated at the left of the wall, so that the low pressure chlorine conduit might extend for as much as 100 feet or so. Where the line 26 is thus relatively long, an appreciable friction loss may arise in such line, being significantly substantial at the higher values of chlorine flow and creating an error in metering since the intended operation of the system relies upon maintenance of the upstream side of the adjustable orifice in the device 28 at a constant pressure, e.g. a vacuum of ½ inch. If a means for automatically compensating such friction loss is found desirable, one convenient arrangement comprises a venturi 174, interposed in the low pressure chlorine line from the valve chamber 54, i.e. between the sections 25 and 26 of this line. The conduit 60, for communication between the upper part of the chamber 40 and the chlorine delivery line, is then connected to the throat of the venturi. The venturi is conveniently designed and proportioned, as will now be readily understood, so that the drop in head or pressure at its throat is equal to the friction loss in the line 26; the friction loss, for any given, and conveniently large flow, being readily determinable in the case of the given line 26, the size and design of the venturi is then easily found. Under such circumstances, and by virtue of the inherent pressure-flow relationship of a venturi device the drop in head at the venturi throat will then also equal the friction loss in the line 26 for all other values of chlorine flow. Thus where the pressure in the chamber portion 94 is to be kept at ½ inch below atmospheric and the pressure in the upper part of chamber 40 is designed to be automatically maintained at such value, the same condition, i.e. a vacuum of ½ will be maintained at the venturi throat. The reducing valve device 24 will under such circumstances then operate to keep the pressure in the chamber 54, line 25, and the upstream end of the line 26 at a suitably higher value which is automatically adjusted for changes of flow, so that the pressure at the downstream end of the conduit 26 is maintained uniformly at the desired ½ inch of vacuum.

Figure 7:
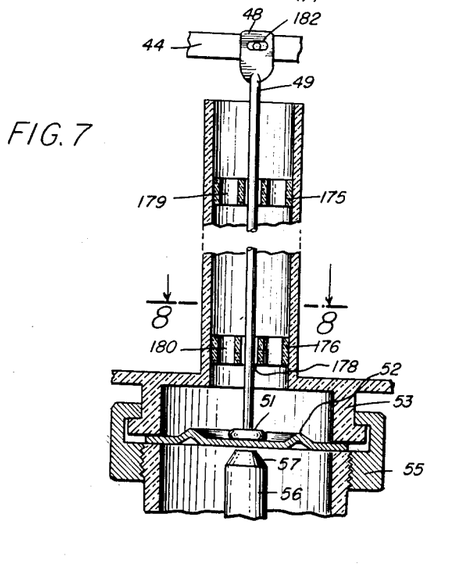
Fig. 7 is an enlarged, fragmentary vertical section showing further details associated with the valve stem and like parts of a reducing valve embodied in Fig. 1.
Figure 8:
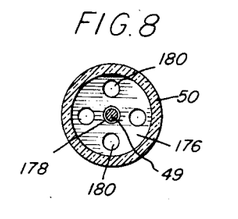
Fig. 8 is a horizontal section on line 8—8 of Fig. 7.

It will be understood that various devices shown in Fig. 1 are illustrated in simplified form, for the sake of clarity, with omission of structural details that are obviously incidental to the mounting and assembly of the various parts, and likewise other elements, now to be mentioned, that contribute to effectiveness in operation. For example, it is ordinarily desirable to provide suitable guide structure for the valve stems 49 and 76, e.g. as generally indicated in Figs. 7 and 8. Thus the sleeve 50 (Figs. 7 and 8 being specifically related to the reducing valve 24) carries a pair of vertically spaced guide disks or bushings 175, 176 having central apertures 177, 178 through which the valve stem 49 is free to slide, the members 175, 176 being appropriately apertured, if desired, as at 179, 180, for complete freedom of pressure communication between the upper side of the diaphragm 52 and the space in the chamber 40 (Fig. 1) above the sleeve 50. By such or other appropriate means, the valve stem 49 is guided to move only along a predetermined vertical line for appropriate positioning of its operating disk 51 opposite the valve opening 57 on the other side of the diaphragm 52. If necessary, to accommodate the slight vertical reciprocation of the valve stem 49 to the rocking motion of the lever 44 the upper end of the valve stem may have an appropriately slotted arrangement 182 for its pivotal connection 48 to the lever.

Although not specifically shown, the device 30 of Fig. 1 may have identical guiding and pivoting arrangements for the valve stem 76 and its connection to the lever 74.

It may be noted, in passing, that in service for supply of chlorine or other gas under pressure and flow conditions of the sort specifically described above, the lever 74 is preferably designed to afford a considerably larger motion for the valve stem 76 than is provided for the stem 49 by the lever 44 of the reducing valve. For instance, in one embodiment of the apparatus, the ratio of the arms of the lever 44 was 23 to 1, while the arm ratio of the lever 74 of the control valve was 8 to 1. The actual gas flow range is the same for both valves, but the total change of pressure drop across the control valve 80—81, is only 12 inches of water, so that a considerably larger range of displacement for this valve element should be afforded (other things being equal) than for the valve element 51 where there is always a drop of the order of 80 pounds per square inch and the percentage change of valve opening for various flows is correspondingly very small.

It will now be seen that the complete apparatus, e.g. as shown in Fig. 1, fully achieves all of the objects and advantages set forth hereinabove. Assuming that the various parts and conduits are suitably connected and assembled, and that the valve control chambers 40 and 70 have been filled with water to the proper levels, the apparatus may be started in operation with ease. A valve 196 in the high pressure chlorine line being initially closed, water flow is initiated in the injector line 35, as by opening the valve 197 upstream of the injector, with corresponding opening of a check or like valve 198 downstream of the latter. At the same time the differential converter 147 may be set in operation, so that vacuum conditions are established beneath the bell 72 and in the line 31 extending to the valve 80—81. Thereupon the high pressure chlorine valve 196 is opened, and the several control instrumentalities, including the valve devices 24 and 30 will rapidly adjust themselves to produce a flow of chlorine through the conduit system 25, 26, 28, 29, 31 and 32 to the injector 33, depending only on the vacuum control by the differential converter 147, and the setting of the metering orifice by the rod 98. The rod position will be automatically adjusted, under the control of the residual responsive controller, to a point at which the desired chlorine residual, but no more, is maintained in the downstream part of the main 22a. As changes in flow occur in the main, corresponding changes in vacuum are communicated to the bell 72, with resulting adjustment of the control valve element 80 and corresponding change in the pressure drop across the metering orifice, shown by the manometer 130. As changes occur in other variables which may affect the response of water to treatment (e.g. temperature, atmospheric pressure, and so-called demand of the water), corresponding changes in position are communicated to rod 98 by the residual-responsive controller 150, as shown by the instrument 107.

The signal derived from residual responsive cell 150 depends on the reaction of the treated fluid (e.g. water) with the treating gas (e.g. chlorine). A relatively long time lag is inherent between the initiation of treatment, at the point of application of the gas to the fluid, and the development of a corresponding signal such as a change of current in the cell. The lag is essential in order to permit the reaction to proceed until a reasonably stable and representative residual can develop. As an example, it is common practice, in the treatment of water with chlorine for sterilization, to require a lapse of 10 to 30 minutes between the time of chlorine application and the time of residual measurement. The use of a signal developed from such a measurement for control requires comparably slow follow-up of the control apparatus in response to the signal, i.e. in order to obtain inherent stability in the system. For this reason, the disclosed arrangement of dual controlling instrumentalities is particularly effective. Changes in main flow commonly are, or can be, rapid. The response to such changes by the flow sensing device, e.g. the venturi 145, and the associated differential converter 147, is effective equally rapidly to modify the gas flow in proportion as herein before described. On the other hand, changes such as temperature, atmospheric pressure, and demand, commonly take place much more gradually. Therefore, the slow response and follow-up of the residual cell and the devices thereby controlled can be effective in compensating for such changes. Furthermore, the chlorine residual control device can be made to yield its response only at periodic intervals (if desired), for greater stability of control of device 28.

It will be seen that rod 98, deriving its controlling signal from the residual responsive cell 150, is effective to correct the chlorine flow in correspondence with change from any source whatsoever which causes the result of treatment (as measured by the chlorine residual) to depart from the desired value. Indeed, this adjustment is applied on top, so to speak, of the more rapid adjustments of control valve element 80 in response to flow changes in the main, and thus tends to correct any inaccuracy of the latter adjustments, the two corrections being independently controlled and applied.

Whereas in previously available chlorinating equipment it has been at least difficult to provide a range of chlorine flow variation greater than several times the minimum flow (i.e. with accuracy of adjustment throughout the range), the present system affords an extremely wide variation with full accuracy over the entire scale. For instance the orifice device alone may provide adjustment (as in Fig. 4) for a minimum flow up to a flow 100 times as great, or more generally, ranges of the order of 1 to 20, up to the figure named and higher. The control valve 30 also provides an adjustment factor of say, ten times, so that the overall factor may be several hundred or more. Not only is such variation of special convenience in water systems involving large variations of chlorine requirement, but it also permits a given type of apparatus to be equally useful, without change, for water-treatment plants of widely differing sizes, i.e. in that there will be at least a completely useful portion of the scale (such as the scale 106) suitable for any given set of circumstances. As also indicated above, the present apparatus is simple and rugged in its structure, requiring little attention for service or otherwise over long periods of time, and involves no connections for water flow and discharge in any of the controlling or indicating instrumentalities. The high pressure chlorine portion of the system may be isolated in a separate room, e.g. together with the reducing valve 24, there being ordinarily no need for attention to any of the apparatus at the right of the wall 38 (Fig. 1) during normal operation, except when the equipment is first turned on or is to be shut down, or except for insertion of fresh tanks of gas.

Whenever it is necessary to shut down the apparatus, the valve 196 is simply closed and the injector water flow is interrupted as by the valve 197, the differential converter 147 or other vacuum control device being likewise appropriately turned off.

The entire operation of the apparatus is highly accurate and reliable and may, as explained, be automatically dependent on conditions of flow and demand in the aqueous liquid under treatment. For many purposes, errors due to temperature or atmospheric pressure changes are relatively small and can be disregarded, or if desired can be compensated by suitable mechanically-effective devices interposed in the adjusting means for the rod 98. Indeed where the apparatus is automatically controlled to maintain a predetermined residual in the main, as by the device 150 in Fig. 1, any changes in the feed of gas due to temperature or pressure variation are inherently compensated, the residual control being necessarily dependent on actual amounts of chlorine supplied.

Figure 10:
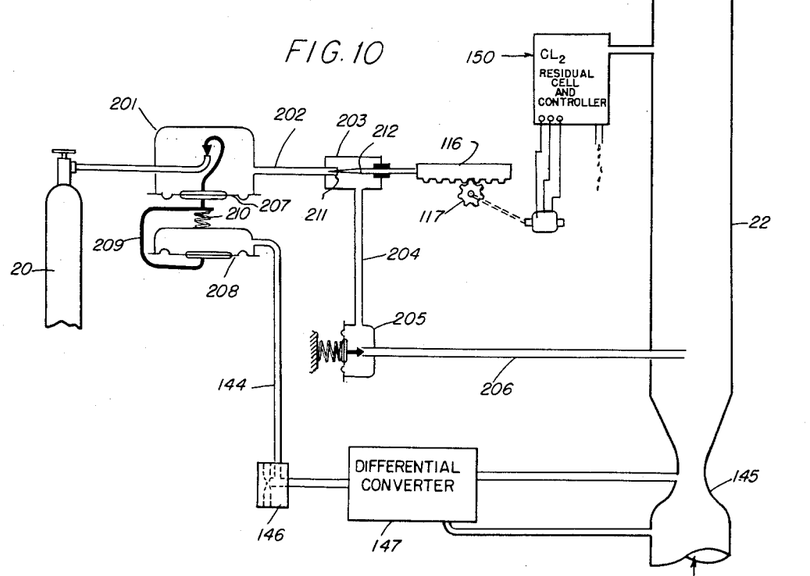
Fig. 10 is a schematic view of a modified embodiment of the invention.

In Fig. 10 is shown a somewhat different embodiment of the invention. Described generally, the system in Fig. 10 comprises an adjustable pressure-reducing valve 201 from which chlorine (out of the tank 20) at greatly reduced positive pressure flows through the conduit 202 to and through an adjustable orifice device 203 and thence via further conduit 204 to a constant back pressure valve 205. From the latter device the gas flows, via a conduit 206, into the pipe or main 22, in which flows the water or other fluid to be treated.

The constant pressure maintained by valve 205 is such that there will be enough pressure available in conduit 206 to force the gas into main 22 against the pressure therein. Diaphragms 207 and 208 (which are rigidly connected together by the element 209) and the biasing spring 210 in the valve 201 are so designed that this valve will maintain a pressure in conduit 202 which exceeds the pressure in conduit 204 by the same amount as that by which the vacuum in pipe 144 is less than atmospheric. The vacuum in pipe 144 is derived from a differential converter 147 (and related elements) as identified by the same reference numbers in Fig. 1. Thus it will be seen that, for a given setting of variable orifice 203, a gas flow rate will be maintained which is proportional to the flow of fluid to be treated in main 22.

As shown in this embodiment, the variable orifice 203 consists of a fixed orifice 211 and a tapered needle 212 which may be moved into and out of the orifice by rack 116 and pinion 117, to vary the effective orifice size. The position of rack 116 is controlled through a residual cell device 150 in the same manner as that described for Fig. 1. It will be seen that the system of Fig. 10 will function according to the invention in the same general manner as the system of Fig. 1. The various devices shown in Fig. 10 are illustrated and explained in simplified form, with omission of details that are similar to those of Fig. 1 or that will be readily understood by persons skilled in the art.

Figure 11:
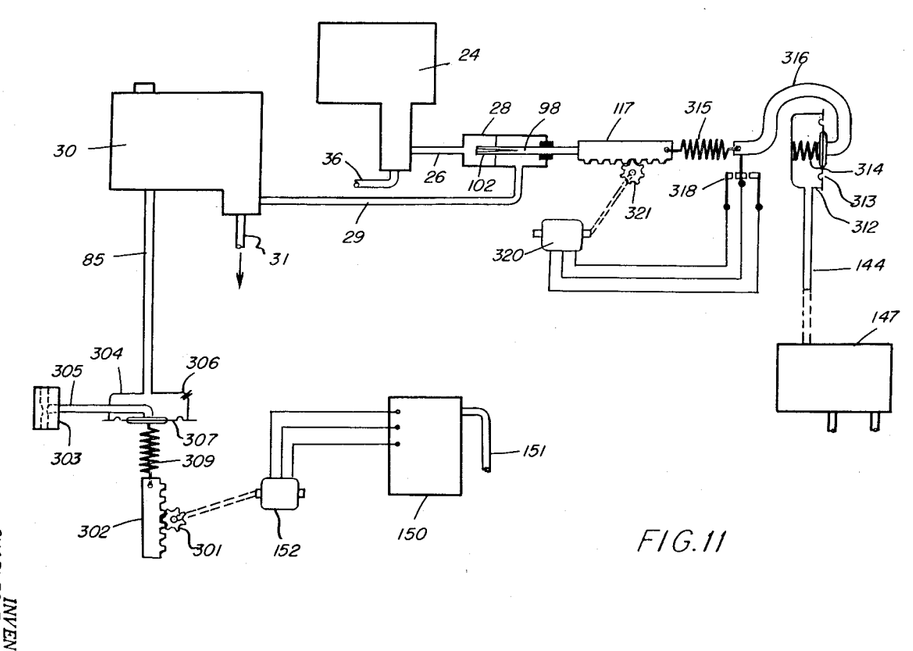
Fig. 11 is a schematic view of another modification of the invention.

Fig. 11 illustrates, in simplified form, an inversion of the controlling instrumentalities shown in Fig. 1, similar elements being identically numbered, and other parts (not shown) being intended to be the same as in Fig. 1. The motor 152, controlled by the residual controller 150, rotates a pinion 301, thereby advancing or retracting a rack 302. An auxiliary source of vacuum, such as an injector 303, evacuates a chamber 304 through a pipe 305. Air is admitted to the chamber 304 through a small, fixed bleed aperture 306. A diaphragm 307 is pulled towards the mouth of pipe 305 by the vacuum in the chamber 304, and this pull is opposed by the tension in a spring 309. The net effect is to regulate the vacuum in the chamber 304 at a value determined by the tension in the spring 309, which, in turn, is controlled by the position assumed by the rack 302 in response to controlling signals from the residual controller 150. For example, assume that the residual measured by the controller decreases, thus indicating the need for greater chlorine flow. In this case, a signal will be delivered to motor 152 which will turn the pinion 301 in a counter-clockwise direction. The rack 302 will move downward, increasing the tension on the spring 309 and moving the diaphragm 307 momentarily away from the opening in the pipe 305. This action will permit the injector 303 to exhaust the chamber 304 to a lower pressure, and the system will reach equilibrium with a somewhat lower pressure communicated through the pipe 85 (to the valve 30; see Fig. 1). Thus a somewhat greater differential will be produced across orifice 28, and a greater flow of chlorine will result. A reverse action occurs when the signal from the controller 150 indicates a need for reduced chlorine flow.

In Fig. 11, the orifice device 28 is controlled by a signal (i.e. from the differential converter 147) which is a function of the fluid flow in the main 22. This signal, in the form of a variable vacuum, communicates through the pipe 144 with a chamber 312. The vacuum acts on a diaphragm 313, enclosing the chamber 312, to create a force which is opposed by a biasing compression spring 314, and which is aided by an adjustable tension spring 315 connected to the diaphragm 313 by the rigid member 316. The force exerted by the spring 315 is controlled by the rack 117. Also attached to the diaphragm 313 by the member 316, is the middle element of a two-way, normally open switch assembly 318. To illustrate the operation, assume that fluid flow through the main 22 (see Fig. 1) increases, thus indicating the need for greater chlorine flow. In this case, the signal vacuum from the differential converter 147 will increase, thus increasing the force on the diaphragm 313 and causing it to be displaced to the left. This movement will engage the center contact with the left-hand contact in the switch assembly 318, and will cause a motor 320 to drive a pinion 321 clockwise, thus moving the rack 116 to the right and decreasing the force exerted by the spring 315. A new position of balance will be reached with the orifice 28 in a relatively wider open position, and with the chlorine flow correspondingly increased. If the water flow in the main decreases, a reverse operation occurs.

The vacuum signal, from differential converters of the type up to now most common, varies in proportion to the square of the fluid flow through the main 22. The devices associated with the orifice device 28 in Fig. 11 are conveniently such that the linear position of rod 98 varies directly as the vacuum. Therefore, it is preferred, when the embodiment illustrated in Fig. 11 is used, to make the notch 102 in the rod 98 of such shape that its cross-sectional area varies as the square root of the longitudinal notch dimension.

It should be understood that the control exerted by the residual controller over valve device 30 must be suitably delayed (e.g. by means of a suitably large ratio of rotation of motor 152 to travel of the rack 302, in a manner which will be readily appreciated) in proportion to the inherent delay which exists between the initiation of a change in chlorine gas flow and the resulting development of a difference in residual chlorine as detected at the residual controller 150. Conversely, the control exerted by the differential converter over the variable orifice device 28 should be suitably rapid, in proportion to the speed with which the differential converter is capable of sensing changes in fluid flow in the main 22.

Figure 12:
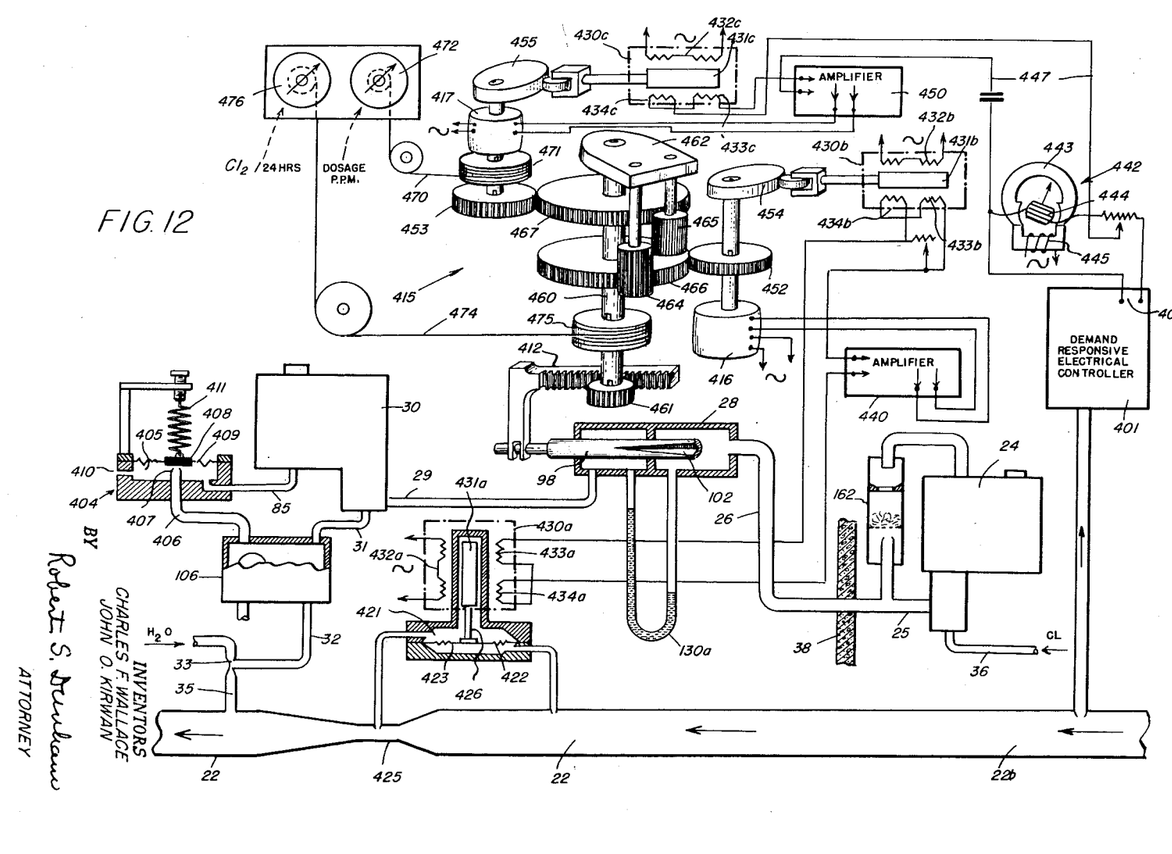
Fig. 12 is a schematic view of a still further and particularly effective embodiment.

Fig. 12 shows another system embodying the invention, wherein identically-numbered elements are similar to corresponding parts in Fig. 1, and wherein other parts or details (not here shown) may be, unless otherwise stated, as illustrated or described in connection with Fig. 1. In this system, the vacuum is maintained at a fixed value, say a drop equal to 12 inches of water, across the adjustable orifice device 28, and the orifice is adjusted, through differential gearing or equivalent means, in accordance with two controlling variables, viz. the rate of flow of water or other fluid under treatment in the main 22, and a determination that involves the need of the fluid for treatment. While the latter branch of control may be exercised by a chlorine residual cell and controller as embodied in Fig. 1, the illustration of Fig. 12 embraces, as an effective alternative, a device 401 which electrically determines the demand of the raw or untreated water for treatment, per unit volume, at a locality 22b of the main sufficiently upstream of the chlorine feed pipe 35 so that (with due account for a sample retention time in the device 401) the demand signal at the terminals 402 represents the condition of the water in the main as it reaches the pipe 35. The electrical output of the device is so arranged or so modified by appropriate electrical conversion, as to provide a small direct current at the terminals 402 which varies in proportion to the need of the water or other fluid for treatment, measured as p.p.m. of chlorine, in order to reach, say, a given residual chlorine content after treatment and reaction.

The path of chlorine flow extends through the upstream pressure-reducing valve device 24, adjustable orifice 28, across which the drop is measured by the manometer 130a, downstream valve device 30, trap device 166 (which may also include a vacuum limiting means if desired, to avoid excessively high suction on the valve 30), injector 33 and the tail or delivery pipe 35 to the main 22. The valve device 30 is controlled to provide a constant vacuum in the pipe 29, say 12½ inches below atmospheric where a vacuum of ½ inch is maintained in the pipe 25—26. Such control is exercised by a vacuum control valve 404, which has a chamber 405 into which a tube 406 has an open end 407 in proximity to a closure member 408 carried by a diaphragm 409. Vacuum control tube 85 from the valve 30 communicates with the chamber 405, while the tube 406 transmits higher vacuum or suction from the device 166. A small port 410 provides a small fixed air bleed between the interior of the chamber 405 and the atmosphere, so that the degree of vacuum established in the chamber by the suction in line 406 can be controlled by the valve 408—407. The tendency of atmospheric pressure, on the diaphragm 409, to close the valve 408—407, is opposed by the tension spring 411, which may therefore be adjusted and set, in tension, so as to maintain a desired constant vacuum, say 12 inches, in the tube 85. As in Fig. 1, the device 30 maintains a pressure ½ inch lower in the conduit 29 than in the tube 85, i.e. a vacuum equal to 12½ inches.

The notched rod 98 of the orifice device 28 is shifted by a rack 412 which is displaced by differential gearing 415, the latter being adjusted both by a motor 416 under control of the demand-detecting device 401 and by a motor 417 under control of a flow-responsive differential converter 420. Although other types of converter may be employed having appropriate mechanical or electrical response, the device 420 comprises a housing providing a pair of chambers 421, 422, separated by a stiffly flexible diaphragm 423 and respectively communicating with the throat and entrance of a venturi 425 in the main 22. Thus changes of pressure difference across the diaphragm, caused by changes of flow in the main, produce vertical adjustment of a stem 426 projecting from the diaphragm.

The electrical control system includes three differential transformers 430a, 430b and 430c, generically designated 430, and having parts numbered alike in each and correspondingly distinguished by characters a, b and c. Each transformer has a movable core 431, an energizing winding 432 and a pair of control windings 433, 434 which are connected in series opposition. All of the windings 432 (viz. 432a, 432b and 432c) are connected to a common, low-voltage source of alternating current. Hence displacement of the core 431 from a null point provides an A.C. voltage signal in the output of the windings 433, 434, which corresponds in amplitude and phase (or polarity) with the amount and direction of shift of the core from the null point.

The core 431a of the transformer 430a is constituted as part of the converter 420, being mounted on the stem 426 so that changes in flow in the main 22 cause changes in the electrical (voltage) output of the transformer, which is connected in series opposition with the similar output of the transformer 431b, across the input of an electronic amplifier 440. Thus upon unbalance in the described circuit the amplifier 440 delivers a control signal to the reversible A.C. motor 416, to drive the motor in a direction corresponding to that of the input unbalance.

A translating meter or transducer 442, having a permanent magnet core 443, has its movable coil or winding 444 connected to the D.C. output (at 402) of the demand-responsive device, and has a cooperating inductor device 445, energized from the same A.C. source as the transformer windings 432, so that upon deflection of the coil 444 from zero-current position, an alternating field from the inductor 445 establishes an alternating voltage across the terminals of the coil. Thus the device 442, in its output leads 447, provides an alternating voltage signal similar to that from the transformers 430, and the device may be broadly defined as a transformer of similar effect.

The output 433c-434c of the transformer 430c and the output leads 447 of the transformer or transducer 442 are connected in series opposition to the input of the electronic amplifier 450, which furnishes an amplified current signal to the control winding of the reversible A.C. motor 417, to drive the latter in a direction corresponding to the direction of unbalance in the input signal of the amplifier.

The motors 416, 417 respectively drive adjusting gears 452, 453, and cams 454, 455, the latter being respectively arranged to shift the transformer cores 431b, 431c, for restoration of balance in the corresponding input circuits of the flow-controlled amplifier 440 and the demand-controlled amplifier 450.

The differential gearing 415 comprises a central shaft 460 carrying a pinion 461 to drive the rack 412, and a pinion arm 462 to which are journalled two mutually meshing pinions 464, 465 that also respectively mesh with gears 466, 467. The gears 466, 467 are rotatably and concentrically disposed on the shaft 460, i.e. so as to be free to turn relative to the shaft, and are respectively engaged by the flow-controlled gear 452 and the demand-controlled gear 453. It will now readily be seen that this system of differential gearing provides a drive for the pinion 461 and thus for adjustment of the orifice rod 98, which is the direct resultant of the movement of the gears 452, 453, or either of them, as to direction and amount.

The mode of operation of the system of Fig. 12, which represents an unusually convenient arrangement for control of chlorine feed or the like in automatic response to two factors, will be readily understood. For example, an increase in water flow in the main 22 shifts the core or armature 431a to a position of electrical unbalance for the input of the amplifier 440, whereupon the motor 416 re-positions the orifice rod 98 to provide correspondingly greater chlorine flow (i.e. in quantitative equality to the signal from the transformer 430a) and adjusts the core 431b to restore electrical balance. Likewise an increase in the demand of the water for chlorination displaces the coil or armature of the transducer 442, and the resulting unbalance in the input of the amplifier 450 causes the motor 417 to shift the orifice rod 98 to increase the chlorine feed, in exact correspondence with the demand signal. Balance is simultaneously restored by repositioning of the core or armature 431c. Signals in the opposite direction from the devices 420, 401, requiring decrease of chlorine feed, effectuate corresponding operations of the motors 416, 417, with similar rebalance of the circuits.

For especially effective cooperation with an orifice device designed as described in connection with Figs. 1–5, the cam 454 is shaped so that the chlorine flow will vary directly as the water flow, and the cam 455 is so shaped as to cause the rate of chlorine feed to vary directly with the demand signal. It will be noted that by providing a logarithmic characteristic for the notch in the orifice rod, the automatic control of chlorine feed by both flow and water quality or demand, is greatly facilitated, i.e. in the use of adjusting means functioning conjointly through relatively simple differential gearing.

More particularly, the cam 454 is shaped so that the position of gear 452 corresponds to the logarithm of the rate of water flow. The cam 455 is shaped so that the position of the gear 453 corresponds to the logarithm of the demand signal. The differential gearing 464, 465, 466 and 467 drives the pinion 461 and thus the orifice rod 98, to a position which corresponds to the algebraic sum of the positions of gears 452 and 453. In consequence the flow of chlorine through the device 28 corresponds to the anti-logarithm of the sum of the respective logarithms of water flow and chlorine demand. That is to say, the chlorine flow is a value of which the logarithm is represented by the position of the rod 98 (by reason of the logarithmic characteristic of the notch 102), and since the rod position represents the sum of the logarithms of flow and demand, the rate of chlorine feed or flow is thus proportioned to the product of the flow of water and the demand of the water for treatment.

A cord 470 from a winding drum 471 on the shaft of the motor 417 may be used to position an indicating or recording device 472 as to dosage of chlorine, e.g. in p.p.m. fed to the water. Similarly a cord 474 from a winding drum 475 on the orifice-adjusting shaft 460 may position a like device 476, showing total rate of chlorine feed, for example in pounds of chlorine per twenty-four hours.

It will be understood that various parts or sub-combinations of the apparatus illustrated in the several figures may be useful separately or in combination with other devices, special utility in such respects residing in the reducing valve 24, as well as in other devices such as the adjustable orifice 28 with its controls and the like.

It is to be understood that the invention is not limited to the specific apparatus herein shown and described but may be embodied in other forms without departure from its spirit.

We claim:

1. In apparatus for feeding gas of a predetermined character to a fluid flow, the combination, with conduit means for said fluid flow, of a conduit for flow of the gas, means at the downstream end of said conduit and extending to said conduit means, for introducing the gas into the fluid, orifice means in the conduit, pressure-regulating means in the conduit upstream and downstream of the orifice means for maintaining a controlled pressure drop across said orifice means, said last-mentioned means including adjusting means therefor to adjust said pressure drop, adjusting means for said orifice means, control means connected to the fluid conduit means for sensing variations in the rate of fluid flow therein, and fluid-testing control means connected to the fluid conduit means for sensing variations of an effect of treating said fluid with gas of the predetermined character which comprise changes caused by variations in composition of the fluid, to determine correspondingly required changes in gas feed that are needed to maitnain a predetermined result of treatment, one of said control means being connected to adjust one of said adjusting means and the other of said control means being connected to adjust the other of said adjusting means, for varying the rate of feed of the gas in accordance with changes of both rate of flow and condition of the fluid, so as to maintain the aforesaid predetermined result of treatment in the fluid.

2. Apparatus as described in claim 1, wherein the fluid-testing control means comprises means testing the fluid of the conduit means at a locality downstream of the connection of the gas conduit, to detect departures of the result of introduction of the gas from the aforesaid predetermined result of treatment.

3. Apparatus as defined in claim 2, wherein the pressure-regulating means comprises a pressure-regulating device in the conduit upstream of the orifice means for maintaining a constant pressure at the upstream side of said orifice means and means in said gas conduit downstream of said orifice means for regulating the pressure on said downstream side of said orifice means, said last-mentioned means including the aforesaid first-mentioned adjusting means, to vary said downstream pressure, and the first-mentioned control means being connected to adjust said first-mentioned adjusting means.

4. In apparatus for feeding gas of a predetermined character to a fluid flow, the combination, with conduit means for said fluid flow, of a conduit for flow of the gas, means at the downstream end of said conduit and extending to said conduit means, for introducing the gas into the fluid, orifice means in the conduit having adjusting means therefor, pressure-regulating means in the conduit upstream and downstream of the orifice means for maintaining a controlled pressure drop across said orifice means, control means connected to the fluid conduit means for sensing variations in the rate of fluid flow therein, and fluid-testing control means connected to the fluid conduit means for sensing variations of an effect of treating said fluid with gas of the predetermined character which comprise changes caused by variations in composition of the fluid, to determine correspondingly required changes in gas feed that are needed to maintain a predetermined result of treatment, means connecting both of said control means for individually and jointly adjusting said adjusting means to vary the rate of feed of the gas in accordance with changes of both rate of flow and condition of the fluid, so as to maintain the aforesaid predetermined result of treatment in the fluid.

5. Apparatus as described in claim 4, wherein the fluid-testing control means comprises means testing the fluid of the conduit means at a locality upstream of the connection of the gas conduit, to detect the demand of the fluid for treatment with gas of the predetermined character to produce said effect to predetermined extent.

6. In apparatus for feeding gas of a predetermined character to a fluid flow, the combination, with conduit means for said fluid flow, of a conduit for flow of the gas, means at the downstream end of said conduit and extending to said conduit means, for introducing the gas into the fluid, adjustable orifice means in the conduit comprising apertured structure and cooperating structure engaging said apertured structure in the aperture thereof, one of said structures being movable relative to the other, and one of said structures extending longitudinally of the path of said mutual movement and being longitudinally grooved to a varying cross-sectional extent to provide an orifice which is adjustable upon said mutual movement, pressure-regulating means in the conduit upstream and downstream of the orifice means for maintaining a controlled pressure drop across said orifice means, said last-mentioned means including adjusting means therefor to adjust said pressure drop, control means connected to the fluid conduit means for sensing variations in the rate of fluid flow therein, and fluid-testing control means connected to the fluid conduit means at a locality thereof downstream of the connection of the gas conduit, to detect departures of the result of the treatment of the fluid with the gas from a predetermined result of treatment, one of said control means being connected to adjust the aforesaid adjusting means and the other of said control means being connected to adjust the adjustable orifice means, for varying the rate of feed of the gas in accordance with changes of both rate of flow and condition of the fluid.

7. In apparatus for feeding gas of a predetermined character to a fluid flow, the combination, with conduit means for said fluid flow, of a conduit for flow of the gas, means at the downstream end of said conduit and extending to said conduit means, for introducing the gas into the fluid, adjustable orifice means in the conduit comprising apertured structure and cooperating structure engaging said apertured structure in the aperture thereof, one of said structures being movable relative to the other, and one of said structures extending longitudinally of the path of said mutual movement and being longitudinally grooved to a varying cross-sectional extent to provide an orifice which is adjustable upon said mutual movement, pressure-regulating means in the conduit upstream and downstream of the orifice means for maintaining a controlled pressure drop across said orifice means, control means connected to the fluid conduit means for sensing variations in the rate of fluid flow therein, fluid-testing control means connected to the fluid conduit means at a locality upstream of the connection of the gas conduit, to detect the demand of the fluid for treatment with gas of the predetermined character to produce a predetermined result of treatment in the fluid per quantity thereof, and means connecting both of said control means for individually and jointly adjusting said adjustable orifice means to vary the rate of feed of the gas in accordance with changes of both rate of flow and condition of the fluid, so as to maintain the aforesaid predetermined result of treatment in the fluid.

8. In apparatus for feeding gas of a predetermined character to a flowing body of fluid in a main, in combination, a conduit for gas flow, means connected with the downstream end of said conduit for introducing the gas into the main, adjustable orifice means in the conduit comprising apertured wall structure across the conduit and longitudinally movable rod means traversing said wall structure and longitudinally notched to provide an orifice through the wall structure adjustable upon longitudinal displacement of the rod means, reducing valve means in the conduit upstream of the orifice means, for maintaining a substantially constant pressure at the upstream side of said orifice, pressure-regulating means in the conduit downstream of the orifice means and including fluid flow-responsive means connected to the main, for adjusting the pressure at the downstream side of the orifice in accordance with changes of fluid flow in the main, fluid-testing control means connected to the main for sensing variations of an effect of treating said fluid with gas of the predetermined character which comprise changes caused by variations in the composition of the fluid, to determine correspondingly required changes in gas feed that are needed to maintain a predetermined result of treatment, and means controlled by said control means for positionally adjusting the rod means to regulate the gas flow for maintaining a substantially constant condition of treatment of the fluid in the main with the gas.

9. In apparatus for advancing gas, in combination, a conduit system for gas flow adapted to receive gas at one end from a source under high pressure and adapted to discharge gas at the other end under lower pressure, reducing valve means in the conduit adjacent the receiving end of the latter and including a valve seat in the conduit, a diaphragm movable toward and away from said seat to provide a correspondingly varying opening in the path of gas flow, a closed vessel adapted to contain liquid in its lower portion and having means providing communication between its upper portion and a locality of the conduit downstream of the valve seat, a bell movably suspended in said vessel and having a lower edge disposed to be submerged in the liquid, means providing communication between the atmosphere and the interior of the bell above the liquid, a diaphragm-moving member, and means linking the bell to said member for positionally regulating the diaphragm to maintain the pressure at said conduit locality at a value bearing a constant relation to atmospheric pressure corresponding to a predetermined relation of liquid levels inside and outside of said bell, adjustable orifice means in the conduit downstream of said reducing valve means, comprising apertured wall structure across the conduit and longitudinally movable rod means traversing said wall structure and longitudinally notched to provide an orifice through the wall structure adjustable upon longitudinal displacement of the rod means, and pressure-regulating means in the conduit downstream of said orifice for maintaining the gas pressure there at a controlled value below the pressure maintained as aforesaid at the aforesaid locality of the conduit, to provide a correspondingly controlled pressure drop across said orifice.

10. In apparatus for advancing gas, in combination, adjustable orifice means in the conduit, pressure-regulating means in the conduit upstream of the orifice means, a second pressure-regulating means in the conduit downstream of the orifice means, each of said pressure-regulating means comprising a closed vessel adapted to contain liquid in its lower portion, a bell movably suspended in said vessel and having a lower edge disposed to be submerged in the liquid, for positional control of the bell in accordance with pressures inside and outside thereof, a valve device in the conduit, and means coupling said device with the bell for actuation thereby, said first pressure-regulating means including means providing communication between the upper part of its vessel around the outside of its bell and a locality in the conduit intermediate its valve device and the adjustable orifice means, and means providing communication between the interior of its bell and the atmosphere, the coupling means of said first pressure-regulating means providing adjustment of its valve device to maintain the pressure in said locality of the conduit at a substantially constant value below atmospheric, and said second pressure-regulating means comprising means providing communication between the upper part of the vessel around the outside of its bell and the conduit upstream of its valve device, an adjustable source of sub-atmospheric pressure, and means providing communication between said last-mentioned source and the interior of the bell of said second pressure-regulating means, the coupling means of said second pressure-regulating means providing a pressure in the conduit downstream of the orifice means which is maintained at a sub-atmospheric value adjusted in accordance with adjustments of said source.

11. In apparatus for advancing gas, in combination, a conduit for gas flow, adjustable orifice means in the conduit comprising apertured wall structure across the conduit and longitudinally movable rod means traversing said wall structure and longitudinally notched to provide an orifice through the wall structure adjustable upon longitudinal displacement of the rod means, pressure-regulating means in the conduit upstream of the orifice means for maintaining a predetermined, substantially constant pressure on the upstream side of the orifice and adjustable pressure-regulating means in the conduit downstream of the orifice means, said last-mentioned pressure-regulating means comprising a valve device in the conduit, a closed vessel adapted to contain liquid in its lower portion, a bell movably suspended in said vessel and having a lower edge disposed to be submerged in the liquid, said vessel having an upper portion surrounding the bell and communicating with the conduit at the upstream side of said valve device, means providing communication between the interior of the bell above the liquid and an adjustable source of pressure, and means linking the bell with said valve device to adjust the latter in accordance with changes of pressure at the interior of the bell, for regulating the conduit pressure downstream of the orifice in accordance with the pressure communicated to the interior of the bell.

12. In apparatus for advancing gas, in combination, a conduit for gas flow, and reducing valve means, a venturi, a long conduit portion and adjustable orifice means disposed in series in said conduit in the order named along the path of gas flow, said long conduit portion being adapted to provide friction-responsive pressure drop in the conduit between the venturi and the upstream side of the adjustable orifice means, said reducing valve means comprising a valve seat, a diaphragm movable toward and away from said seat to provide a correspondingly varying opening in the conduit, means including a suspended bell for displacing said diaphragm under control of pressures inside and outside the bell to maintain a predetermined relation of said pressures, said bell having a lower edge, chamber means adapted to contain liquid for submerging the lower edge of said bell, said chamber means having an upper, enclosed portion communicating with said conduit at the throat of said venturi, and means providing communication between the interior of the bell and an external source of controlled pressure, said diaphragm displacing means and said venturi cooperating to maintain the pressure in the conduit at the upstream side of the orifice means at a predetermined, substantially constant value governed by said external source of pressure.

References Cited in the file of this patent
UNITED STATES PATENTS

| | | |
|---|---|---|
| 2,315,512 | Everson | Apr. 6, 1943 |
| 2,358,611 | Ziebolz | Sept. 19, 1944 |
| 2,783,769 | Philbrick | Mar. 5, 1957 |
| 2,800,915 | Tavener | July 30, 1957 |

UNITED STATES PATENT OFFICE

CERTIFICATE OF CORRECTION

Patent No. 2,929,393            March 22, 1960

Charles F. Wallace et al.

It is hereby certified that error appears in the printed specification of the above numbered patent requiring correction and that the said Letters Patent should read as corrected below.

Column 1, line 30, for "condition" read -- conditions --; column 14, line 48, after "½" insert -- inch --; column 16, line 44, for "for" read -- from --; column 21, line 63, for "maitnain" read -- maintain --.

Signed and sealed this 11th day of April 1961.

(SEAL)
Attest:

ERNEST W. SWIDER            ARTHUR W. CROCKER
Attesting Officer            Acting Commissioner of Patents